US012785135B2

(12) United States Patent
Ko et al.

(10) Patent No.: US 12,785,135 B2
(45) Date of Patent: Nov. 3, 2026

(54) SECONDARY BATTERY HAVING STRUCTURE IN WHICH UNIT CELLS WHICH BECOME THINNER IN ONE DIRECTION ARE RADIALLY ASSEMBLED, AND DEVICE COMPRISING SAME

(71) Applicant: LG ENERGY SOLUTION, LTD., Seoul (KR)

(72) Inventors: Yo Han Ko, Daejeon (KR); Jung Noh Lee, Daejeon (KR); Jong Pil Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 743 days.

(21) Appl. No.: 17/435,353

(22) PCT Filed: Aug. 11, 2020

(86) PCT No.: PCT/KR2020/010615
§ 371 (c)(1),
(2) Date: Aug. 31, 2021

(87) PCT Pub. No.: WO2021/080137
PCT Pub. Date: Apr. 29, 2021

(65) Prior Publication Data

US 2022/0140382 A1 May 5, 2022

(30) Foreign Application Priority Data

Oct. 25, 2019 (KR) ........................ 10-2019-0133561

(51) Int. Cl.
*H01M 10/04* (2006.01)
*H01M 4/02* (2006.01)
(Continued)

(52) U.S. Cl.
CPC ....... *H01M 10/0463* (2013.01); *H01M 4/661* (2013.01); *H01M 4/74* (2013.01); *H01M 2004/025* (2013.01)

(58) Field of Classification Search
CPC .... H01M 10/0463; H01M 4/661; H01M 4/74; H01M 2004/025
See application file for complete search history.

(56) References Cited

U.S. PATENT DOCUMENTS

2005/0123828 A1* 6/2005 Oogami .............. H01M 50/569 429/152
2012/0288747 A1* 11/2012 Naoi ...................... H01G 11/12 429/163
2014/0079995 A1* 3/2014 Wakada ............. H01M 4/0435 429/211

FOREIGN PATENT DOCUMENTS

CN 202474092 U 10/2012
CN 105186006 A 12/2015
(Continued)

OTHER PUBLICATIONS

Extended European Search Report issued from the European Patent Office dated May 3, 2022 in connection with the corresponding European Patent Application No. 20878093.2.
(Continued)

*Primary Examiner* — Brian R Ohara
*Assistant Examiner* — Emily Elizabeth Freeman
(74) *Attorney, Agent, or Firm* — Morgan, Lewis & Bockius LLP

(57) ABSTRACT

The present invention provides a secondary battery having a novel structure in which unit cells which become thinner in one direction are radially assembled, and a device comprising same, and when a collector having a through-hole in the thickness direction is to be applied, the variation range of the
(Continued)

100 concentration of the electrolyte in the battery is reduced, helping to improve the performance of the battery.

18 Claims, 5 Drawing Sheets

(51) Int. Cl.
*H01M 4/66* (2006.01)
*H01M 4/74* (2006.01)

(56) References Cited

FOREIGN PATENT DOCUMENTS

| | | | | |
|---|---|---|---|---|
| CN | 104659289 | B | | 3/2017 |
| CN | 109830690 | A | | 5/2019 |
| JP | S50-134631 | U | | 11/1974 |
| JP | S51-090416 | U | | 7/1975 |
| JP | S51-065331 | A | | 6/1976 |
| JP | H07-130344 | A | | 5/1995 |
| JP | H11-67187 | A | | 3/1999 |
| JP | 2000-311693 | A | | 11/2000 |
| JP | 3386698 | B2 | | 3/2003 |
| JP | 2003-208917 | A | | 7/2003 |
| JP | 2010-102962 | A | | 5/2010 |
| JP | 2014007108 | A | * | 1/2014 |
| JP | 5687087 | B2 | | 3/2015 |
| JP | 2015-095412 | A | | 5/2015 |
| JP | 2018-200755 | A | | 12/2018 |
| KR | 10-2006-0015060 | A | | 2/2006 |
| KR | 10-2007-0105114 | A | | 10/2007 |
| KR | 10-2008-0087686 | A | | 10/2008 |
| KR | 10-1365718 | B1 | | 2/2014 |
| KR | 10-2014-0088677 | A | | 7/2014 |
| KR | 10-2017-0027976 | A | | 3/2017 |
| KR | 20170022289 | A | * | 3/2017 |
| KR | 10-2017-0038263 | A | | 4/2017 |
| KR | 10-2017-0045804 | A | | 4/2017 |
| KR | 10-2017-0070452 | A | | 6/2017 |
| KR | 10-2017-0142212 | A | | 12/2017 |
| KR | 10-1859872 | B1 | | 5/2018 |

OTHER PUBLICATIONS

Decision of Rejection issued Oct. 28, 2023, by the Chinese Patent Office corresponding to Chinese Patent Application No. 202080030235.9.

International Search Report (with partial translation) and Written Opinion dated Dec. 2, 2020 issued in corresponding International Patent Application No. PCT/KR2020/010615.

Office action dated Nov. 28, 2022 issued in corresponding Japanese Patent Application No. 2021-552662.

Office Action dated Mar. 28, 2025 issued in the counterpart Korean Patent Application No. 10-2019-0133561.

* cited by examiner

【FIG. 1】
100
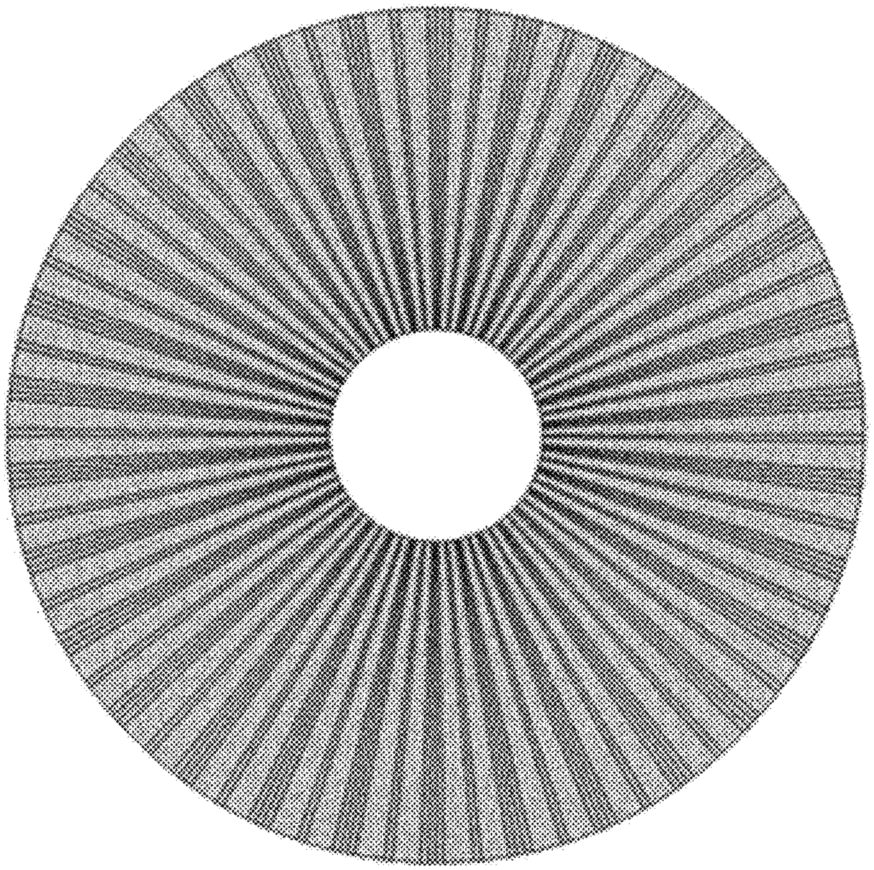

【FIG. 2】
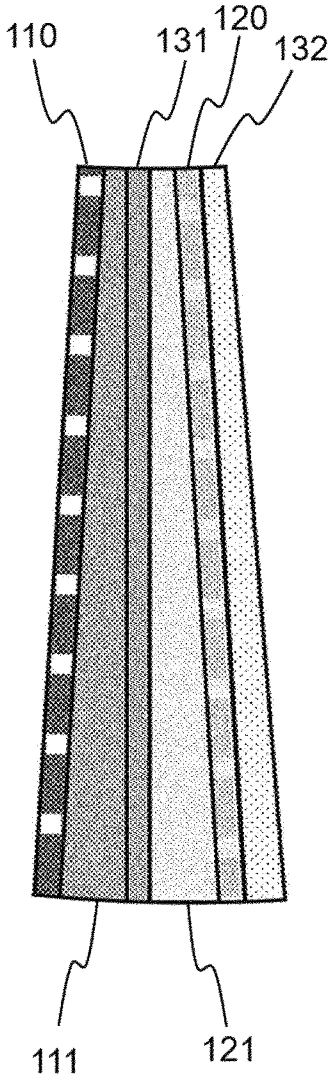

【FIG. 3】
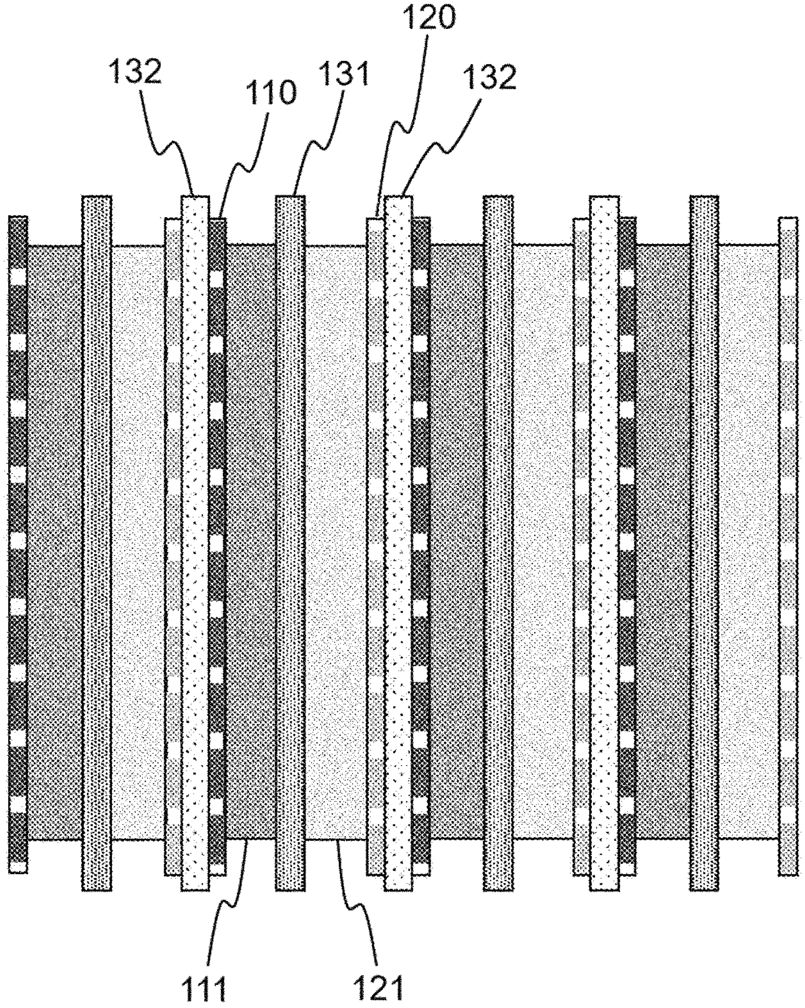

【FIG. 4】
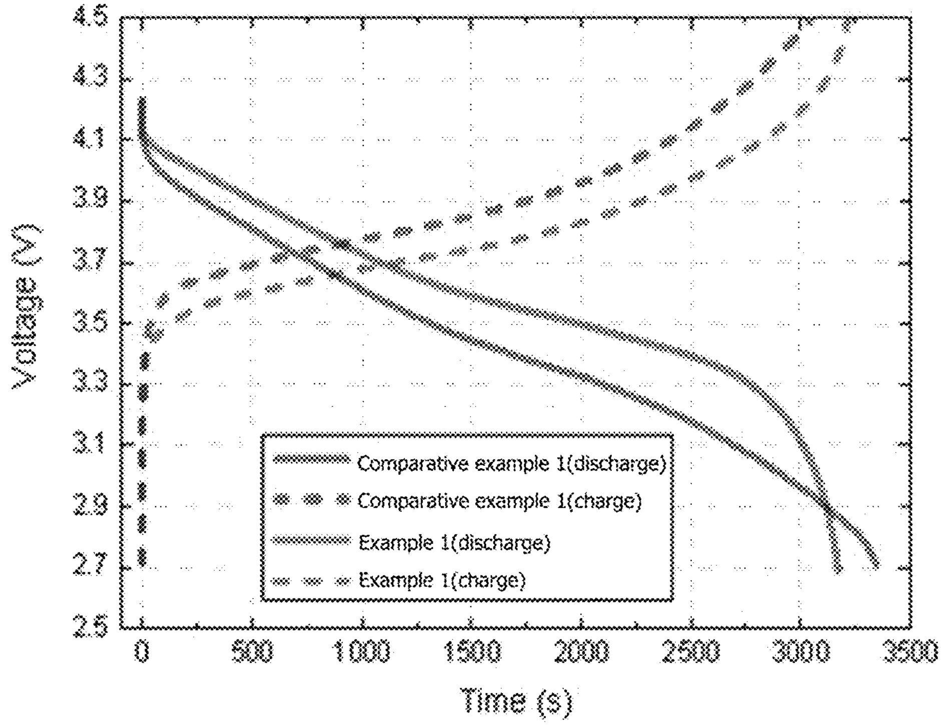

【FIG. 5】
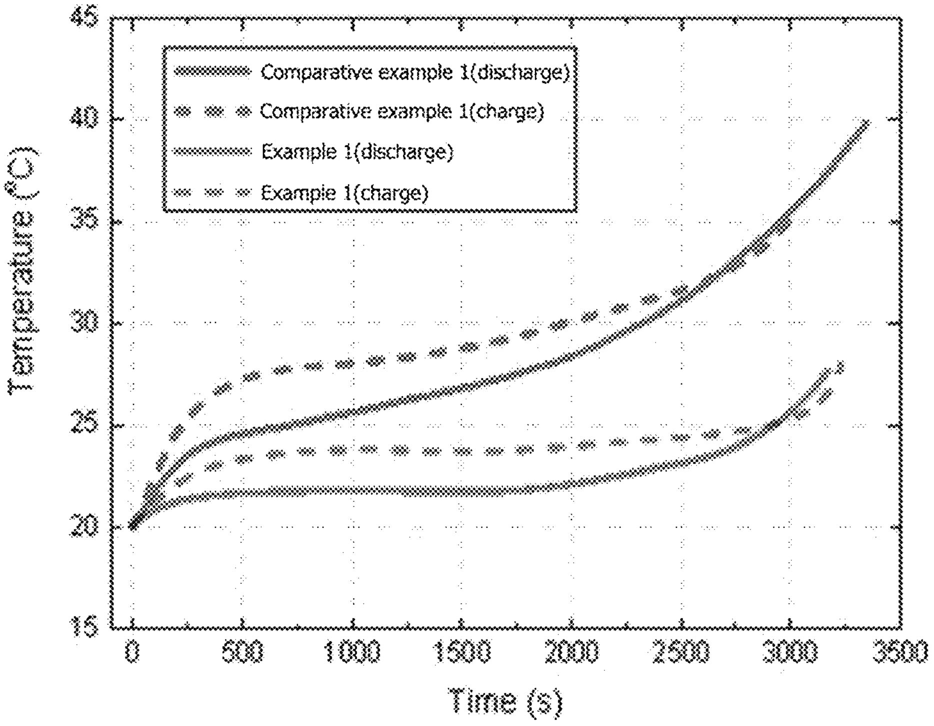

SECONDARY BATTERY HAVING STRUCTURE IN WHICH UNIT CELLS WHICH BECOME THINNER IN ONE DIRECTION ARE RADIALLY ASSEMBLED, AND DEVICE COMPRISING SAME

This application claims the benefit of priority based on Korean Patent Application No. 10-2019-0133561, filed on Oct. 25, 2019, and the entire contents of the Korean patent application are incorporated herein by reference.

TECHNICAL FIELD

The present invention relates to a secondary battery including a structure in which unit cells whose thickness decreases in one direction are radially assembled, and a device including the same.

BACKGROUND ART

As the price of energy sources increases due to the depletion of fossil fuels, and interest in environmental pollution is amplified, the demand for eco-friendly alternative energy sources is increasing. In particular, as technology development and demand for mobile devices increase, the demand for secondary batteries as energy sources is rapidly increasing. As the demand for secondary batteries is diversified and increased, there is a demand for new types of secondary batteries.

In addition, in the case of a lithium secondary battery, lithium ions in an electrolyte solution generally exhibit high ion conductivity in a specific concentration range, and when the concentration is thinner or thicker than this, the ion conductivity decreases. The concentration of electrolyte solution or lithium ions inside the lithium secondary battery is not constant, and depending on the operating conditions of the battery, the concentrations of lithium ions near the positive electrode and the negative electrode behave in opposite directions.

Therefore, there is a need for a new type of secondary battery technology that solves this problem.

DISCLOSURE

Technical Problem

The present invention was invented to solve the above problems, and an object of the present invention is to provide a new type of secondary battery including a structure in which unit cells whose thickness decreases in one direction are radially assembled, and a device including the same.

Technical Solution

In one example, a secondary battery according to the present invention is formed as n (n is an integer of 5 or more) unit cells are radially assembled around a central axis based on a horizontal cross-sectional structure. Herein, each unit cell has a structure in which its cell thickness decreases in a direction of the central axis from an outer end that forms an outer peripheral surface of the battery based on the horizontal cross-sectional structure.

In a specific example, in the secondary battery, a k-th (k is an integer between 1 and n−1) unit cell and a (k+1)-th unit cell are adjacent to each other and face each other. Further, a first unit cell and an n-th (n is an integer between 5 and 10000) unit cell are also adjacent to each other and face each other. The n value may vary depending on the size of the device to be applied. For mobile or small devices, n may be 1000 or less, and in the case of large cells for vehicles, etc., the unit cells may be aggregated in the range of 1000 to 10000.

In one example, the secondary battery has a cylindrical structure in which n (n is an integer of 5 or more) unit cells are radially assembled around a central axis to form a hollow based on a horizontal cross-sectional structure, and a diameter ratio of inner and outer diameters of the secondary battery is in a range of 1:1.1 to 100.

In yet another example, in each unit cell forming a battery, the ratio ($D_{in}$:$D_{out}$) of the thickness ($D_{in}$) of the inner end forming the inner peripheral surface of the battery in the center direction and the thickness ($D_{out}$) of the outer end forming the outer peripheral surface of the battery is in the range of 1:1.1 to 100, based on the horizontal section structure.

In a specific example, in each unit cell forming the battery, at least one of the positive electrode and the negative electrode has a structure in which the distance between the electrodes decreases in the center direction from the outer end that forms the outer peripheral surface of the battery based on the horizontal cross-sectional structure.

In another specific example, in each unit cell forming a battery, a positive electrode and a negative electrode each have a structure in which a mixture layer including an active material is applied on a metal current collector. Further, at least one of the positive electrode and the negative electrode has a structure in which the thickness of the mixture layer applied on the metal current collector decreases in the direction of the central axis at the outer end forming the outer peripheral surface of the battery based on the horizontal cross-sectional structure.

In another specific example, in each unit cell forming a battery, a positive electrode and a negative electrode each have a structure in which a mixture layer including an active material is applied on a metal current collector. Further, at least one of the positive electrode and the negative electrode has a structure in which the density of the mixture layer applied on the metal current collector increases in the direction of the central axis at the outer end forming the outer peripheral surface of the battery based on the horizontal cross-sectional structure.

In one example, each unit cell includes a positive electrode and a negative electrode, and a first separator is interposed between the positive electrode and the negative electrode, and a second separator is interposed between the unit cells.

In a specific example, the positive electrode and the negative electrode have a structure in which a mixture layer including an active material is laminated on one surface of a current collector in a direction facing the first separator, respectively.

In one example, in each unit cell forming the battery, a metal current collector forming at least one of a positive electrode and a negative electrode has a porous structure in which a through-thickness hole is formed.

In a specific example, in each unit cell forming the battery, a metal current collector forming at least one of a positive electrode and a negative electrode has a porous structure in which a through-thickness hole is formed, and an area fraction in which the through holes are formed is in a range of 10 to 80%. For example, the metal current collector having the porous structure is in a form of a mesh.

In further another example, the present invention provides a device including the above-described secondary battery. Specifically, the device may include a mobile device, a wearable device, a power tool that moves by receiving power by a battery-based motor, a drone, or an Electric Vehicle (EV), a Hybrid Electric Vehicle (HEV), a Plug-in Hybrid Electric Vehicle (PHEV), an Electric Bike (E-bike), an Electric Scooter (E-scooter), an Electric Golf Cart (electric golf cart) or a power storage system.

Advantageous Effects

A secondary battery and a device including the same according to the present invention propose a new structure in which unit cells whose thickness decreases in one direction are radially assembled, and when a current collector with a through-type hole formed in the thickness direction is applied, the variation in concentration of the electrolyte solution in the battery can be reduced, thereby improving battery performance.

BRIEF DESCRIPTION OF THE DRAWINGS

FIG. 1 is a schematic diagram showing a cross-sectional structure of a secondary battery according to an embodiment of the present invention.

FIGS. 2 and 3 are partially enlarged views showing cross-sectional structures of an electrode assembly in a horizontal direction and a vertical direction, respectively, according to an embodiment of the present invention.

FIGS. 4 and 5 are graphs showing results of comparing and evaluating voltage and temperature changes during charging and discharging of a secondary battery according to an embodiment of the present invention, respectively.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In addition, the meaning of "cylindrical" or "circular" in the present invention includes not only the case of a physical cylindrical or circular shape, but also a case in which the overall shape is close to a cylinder or a circle. For example, in the case that the cross-sectional shape of a battery is n-shaped, if n is 5 or more, or 10 or more, it should be interpreted as being included in the circular category.

In the present invention, based on a horizontal cross-sectional structure, n (n is an integer of 5 or more) unit cells are radially assembled around a central axis to form a battery. Herein, each unit cell provides a secondary battery having a structure in which a cell thickness decreases in a direction of a central axis from an outer end forming an outer peripheral surface of the battery based on a horizontal cross-sectional structure. In the secondary battery according to the present invention, a plurality of unit cells are radially assembled to form a battery. The shape of the secondary battery may have a circular shape or a shape close to it, an n-gonal shape, or a fan shape, based on a horizontal cross-sectional structure.

The number n of unit cells collected in the secondary battery is an integer of 5 or more, and specifically in the range of 5 to 10000, 5 to 100, 100 to 1000, 1000 to 10000, 500 to 5000, or 3000 to 10000. The number n of the unit cells can be variously designed according to the shape, structure, or required physical properties of the battery.

In one embodiment, in the secondary battery, the k-th (k is an integer between 1 and n−1) unit cell and the k+1-th unit cell are adjacent to each other and face each other. In addition, the first unit cell and the n-th unit cell (n is an integer between 5 and 10000) are also adjacent to each other and face each other. For example, in the secondary battery, a plurality of unit cells may be radially assembled to form a cylindrical structure. In this case, the outer peripheral surface of the cylindrical structure is determined by the number of unit cells, and a circular or n-gonal shape can be formed based on the cross section.

In one embodiment, the secondary battery may have a structure in which a hollow penetrating in a vertical direction is formed in the center of the secondary battery as a whole and the exterior has a cylindrical shape. Specifically, the secondary battery has a cylindrical structure in which n unit cells (n is an integer of 5 or more) are radially aggregated around a central axis to form a hollow based on a horizontal cross-sectional structure. In addition, the secondary battery has a diameter ratio of an inner diameter and an outer diameter of 1:1.1 to 100. The diameter ratio of the inner diameter and the outer diameter of the secondary battery is calculated based on the average values of the inner diameters and the outer diameters, respectively. In a specific example, the secondary battery has a diameter ratio of the inner diameter and the outer diameter of the battery in the range of 1:1.1 to 100, 1:1.5 to 80, 1:2 to 50, 1:10 to 100, or 1:30 to 100.

In yet another embodiment, in each unit cell forming a battery, the ratio ($D_{in}$:$D_{out}$) of the thickness ($D_{in}$) of the inner end forming the inner peripheral surface of the battery in the center direction and the thickness ($D_{out}$) of the outer end forming the outer peripheral surface of the battery is in the range of 1:1.5 to 10, based on the horizontal section structure. In a specific example, the ratio ($D_{in}$:$D_{out}$) is in the range of 1:1.1 to 100, 1:1.5 to 80, 1:2 to 50, 1:10 to 100, or 1:30 to 100.

The unit cell included in the secondary battery according to the present invention has a shape in which the thickness decreases in one direction. This is a form differentiated from conventional prismatic batteries, pouch-type batteries, or cylindrical batteries. Existing secondary batteries have a difference in external shape, but unit cells constituting each battery are manufactured with a uniform overall thickness, but are merely different in a stacked form or a winding form. In one embodiment, in each unit cell forming the battery, at least one of the positive electrode and the negative electrode has a structure in which the distance between the electrodes decreases in the center direction from the outer end that forms the outer peripheral surface of the battery based on the horizontal cross-sectional structure.

In addition, by applying a structure in which the unit cells in the form in which the thickness decreases in one direction and the unit cells having a uniform thickness are assembled together, a secondary battery applicable to various types of devices can be manufactured. For example, in the case of a mobile smart watch, a secondary battery that can be stored inside the watch band may be applied. Herein, the watch band may be formed in a form in which a straight section area and a curved section area are combined. At this time, by using a secondary battery having a structure in which unit cells of uniform thickness are assembled in the straight section area of the watch band and unit cells whose thickness decreases in one direction are assembled in the curved section area, a secondary battery of a desired shape can be easily manufactured.

In a specific embodiment, in each unit cell forming a battery, a positive electrode and a negative electrode each have a structure in which a mixture layer including an active material is applied on a metal current collector. Further, at least one of the positive electrode and the negative electrode has a structure in which the thickness of the mixture layer applied on the metal current collector decreases in the direction of the central axis at the outer end forming the outer peripheral surface of the battery based on the horizontal cross-sectional structure. That is, the present invention is designed to increase or decrease the thickness of the material mixture layer loaded on the current collector in one direction, thereby imparting thickness orientation to the unit cell.

In another specific embodiment, in each unit cell forming a battery, a positive electrode and a negative electrode each have a structure in which a mixture layer including an active material is applied on a metal current collector. Further, at least one of the positive electrode and the negative electrode has a structure in which the density of the mixture layer applied on the metal current collector increases in the direction of the central axis at the outer end forming the outer peripheral surface of the battery based on the horizontal cross-sectional structure. As described above, when the present invention is designed to increase or decrease the thickness of the material mixture layer loaded in the current collector in one direction, capacity non-uniformity may occur depending on the location or direction of the unit cells. In the present invention, by designing to decrease or increase the density of the mixture layer loaded in the current collector in one direction, it is possible to compensate for the capacity unevenness according to the thickness orientation in the unit cell. For example, in an area in which the thickness of the mixture layer laminated on the current collector is small, the density of the mixture layer may be set to be high. The density orientation of the mixture layer can be realized by pressing or depressurizing in one direction when pressing with a roller while uniformly loading the mixture layer on the current collector.

In one embodiment, each unit cell constituting the secondary battery according to the present invention includes a positive electrode and a negative electrode, a first separator is interposed between the positive electrode and the negative electrode, and a second separator is interposed between the unit cells. In this case, the positive electrode and the negative electrode may have a structure in which a mixture layer including an active material is laminated on one surface of a current collector in a direction facing the first separator.

Specifically, in each unit cell forming a battery, a metal current collector forming at least one of a positive electrode and a negative electrode has a porous structure in which a through-thickness hole is formed. In the secondary battery according to the present invention, by applying a current collector having a through-type hole formed in the thickness direction to a unit cell, it is possible to improve the performance of the battery by reducing the width of change in the concentration of the electrolyte or lithium ions in the battery. In the present invention, by applying the current collector in which the through-type hole in the thickness direction is formed to the unit cell, the lithium ion concentration in the electrolyte solution can be uniformly maintained within a certain range. Through this, it is possible to increase battery performance by reducing an electrolyte-related overvoltage factor among overvoltage factors of a battery.

In one embodiment, in each unit cell forming a battery, a metal current collector forming at least one of a positive electrode and a negative electrode has a porous structure in which a through-thickness hole is formed, and the area fraction in which the through-type hole is formed is in the range of 10 to 80%. Specifically, the area fraction in which the through hole is formed is in the range of 10 to 80%, 10 to 70%, 10 to 50%, 20 to 90%, 30 to 90%, or 30 to 60%. By controlling the number or area fraction per unit area of through holes in the above range, it is possible to reduce the deformation rate of the current collector and reduce the range of change of the electrolyte solution concentration and the lithium ion concentration in the battery without a significant decrease in mechanical strength.

In a specific example, the through hole has a structure in which 10 to 500 holes are formed per unit area of 10 cm×10 cm. Specifically, the number of through holes per unit area may be 10 to 300, 10 to 200, 10 to 100, 10 to 70, 30 to 50, 50 to 500, 100 to 200, 50 to 300, 100 to 500, 30 to 200, or 10 to 200. For example, the metal current collector has a mesh shape.

The secondary battery in the present invention is, for example, a lithium secondary battery. The lithium secondary battery may include, for example, an electrode assembly described above; a non-aqueous electrolyte impregnating the electrode assembly; and a battery case containing the electrode assembly and the non-aqueous electrolyte.

The positive electrode has a structure in which a positive electrode mixture layer is stacked on one or both sides of a positive electrode current collector. The positive electrode active materials may each independently be a lithium-containing oxide, and may be the same or different. A lithium-containing transition metal oxide may be used as the lithium-containing oxide. In one example, the positive electrode mixture layer includes a conductive material and a binder polymer in addition to the positive electrode active material, and if necessary, may further include a positive electrode additive commonly used in the art.

The current collector used for the positive electrode is a metal having high conductivity, and any metal which the positive electrode active material slurry may be easily attached to and which is not reactive in the voltage range of the secondary battery can be used. Specifically, non-limiting examples of the current collector for the positive electrode include aluminum, nickel, or a foil manufactured by a combination thereof. Specifically, the current collector for the positive electrode is formed of metal components described above, and includes a metal plate having a through hole in the thickness direction, and an ion conductive porous reinforcing material filled in the through hole of the metal plate.

The negative electrode may further include a negative electrode mixture layer, and may include a carbon material, lithium metal, silicon, or tin. When a carbon material is used as the negative electrode active material, both low crystalline carbon and high crystalline carbon may be used. Representative examples of low crystalline carbon include soft carbon and hard carbon are typical. Representative examples of high crystalline carbon include natural graphite, kish graphite, pyrolytic carbon, mesophase pitch based carbon fiber, mesocarbon microbeads, mesophase pitches, and high-temperature calcined carbons such as petroleum or coal tar pitch derived cokes.

Non-limiting examples of the current collector used for the negative electrode include copper, gold, nickel, or a foil manufactured by a copper alloy or a combination thereof. In addition, the current collector may be used by stacking substrates made of the above materials. Specifically, the current collector for the negative electrode is formed of metal components described above, and includes a metal plate having a through hole in the thickness direction, and an ion conductive porous reinforcing material filled in the through hole of the metal plate.

In addition, the negative electrode may include a conductive material and a binder commonly used in the art.

The first and second separators may be made of any porous substrate used in a lithium secondary battery, and for example, a polyolefin-based porous membrane or a nonwoven fabric may be used, but the present invention is not particularly limited thereto. Examples of the polyolefin-based porous membrane include polyethylene such as high density polyethylene, linear low density polyethylene, low density polyethylene, ultra high molecular weight polyethylene, and a membrane in which polyolefin-based polymers, such as polypropylene, polybutylene, and polypentene, are each formed alone or in a mixture thereof.

According to an embodiment of the present invention, the electrolyte may be a non-aqueous electrolyte. Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc. However, it is not particularly limited thereto, and a number of electrolyte components commonly used in the field of lithium secondary batteries may be added or subtracted within an appropriate range.

In addition, the present invention provides a device including the secondary battery described above. In a specific example, the device includes a mobile device, a wearable device, a power tool that moves by receiving power by a battery-based motor, a drone, or an Electric Vehicle (EV), a Hybrid Electric Vehicle (HEV), a Plug-in Hybrid Electric Vehicle (PHEV), an Electric Bike (E-bike), an Electric Scooter (E-scooter), an Electric Golf Cart (electric golf cart) or a power storage system.

For example, when the secondary battery of the present invention is included in a smart watch that is a mobile electronic device, conventional pouch-type batteries require stacking multiple thin electrodes on a flat surface, but the secondary batteries of the present invention can be manufactured in a hollow structure by itself, so that they are suitable to be manufactured according to the shape of a watch band. In addition, it can be applied to ultra-small devices such as wireless earphones because it can achieve high capacity compared to its size. On the other hand, since it is easy to adjust the size according to the number of unit cells assembled, it can be applied to large cylindrical batteries for electric vehicles.

Hereinafter, the present invention will be described in more detail through examples and drawings. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

Example 1

100 parts by weight of NCM ($LiNi_{0.8}Co_{0.1}Mn_{0.1}O_2$) as a positive electrode active material, 1.5 parts by weight of carbon black (FX35, Denka) as a conductive material, and 2.3 parts by weight of polyvinylidene fluoride (KF9700, Kureha) as a binder polymer were added to NMP (N-methyl-2-pyrrolidone) as a solvent to thereby prepare a positive electrode mixture layer slurry. The positive electrode mixture layer slurry was coated on one side of an aluminum current collector with through holes in a thickness direction in a loading amount of 640 mg/25 $cm^2$ and then vacuum-dried to thereby obtain a positive electrode. In the aluminum current collector, the through-type holes are formed in an area fraction of about 40%, and about 50 holes are formed per unit area of 10 cm×10 cm. In addition, the positive electrode mixture layer was pressed to decrease sequentially to a thickness of about 40% in one direction.

100 parts by weight of artificial graphite (GT, Zichen (China)) as a negative electrode active material, 1.1 parts by weight of carbon black (Super-P) as a conductive material, 2.2 parts by weight of styrene-butadiene rubber, and 0.7 parts by weight of carboxy methyl cellulose to water were added to water as a solvent to prepare a negative electrode active material, and was then coated, dried and pressed on one side of a copper current collector with through holes in a thickness direction, to thereby manufacture a negative electrode. In the copper current collector, the through-type holes are formed in an area fraction of about 40%, and about 50 holes are formed per unit area of 10 cm×10 cm. In addition, the positive electrode mixture layer was pressed to decrease sequentially to a thickness of about 40% in one direction.

On the other hand, polypropylene was uniaxially stretched using a dry method to prepare a separator having a microporous structure having a melting point of 165° C. and a width of 200 mm on one side. The first separator was interposed between the positive electrode and the negative electrode, and unit cells having a structure in which the second separator was located outside the positive electrode and the negative electrode were repeatedly assembled to prepare an electrode assembly. The electrode assembly has a structure in which 50 unit cells are radially assembled around a central axis based on a horizontal cross-sectional structure.

After the electrode assembly was built into a hollow cylindrical battery case, a 1M $LiPF_6$ carbonate-based solution electrolyte was injected to complete a battery.

FIG. 1 shows a cross-sectional structure of a manufactured secondary battery. In addition, FIG. 2 is a partially enlarged view of a cross-sectional structure in a horizontal direction of an electrode assembly included in a secondary battery, and FIG. 3 is a partial enlarged view of a cross-sectional structure in a vertical direction of an electrode assembly included in a secondary battery.

Referring to FIG. 1, a secondary battery 100 according to an embodiment of the present invention has a structure in which 50 unit cells are radially assembled around a central axis based on a horizontal cross-sectional structure. In addition, each unit cell has a structure in which the cell thickness decreases in the direction of the central axis from an outer end that forms an outer peripheral surface of the battery based on a horizontal cross-sectional structure.

Referring to FIG. 2, the unit cells constituting the secondary battery have a structure in which a negative electrode current collector 110, a negative electrode mixture layer 111, a first separator 131, a positive electrode mixture layer 121, a positive electrode current collector 120, and a second separator 132 are sequentially stacked. In addition, the negative electrode current collector 110 and the positive electrode current collector 120 have a structure in which through-type holes are formed in the thickness direction. The negative electrode mixture layer 111 and the positive electrode mixture layer 121 each have a structure in which the thickness of the mixture layers 111 and 121 applied on the metal current collectors 110 and 120 decrease and the density increases in the direction of the central axis at the outer end that forms the outer peripheral surface of the battery.

Referring to FIG. 3, in the unit cells constituting the secondary battery, a structure, in which a negative electrode current collector 110, a negative electrode mixture layer 111, a first separator 131, a positive electrode mixture layer 121, a positive electrode current collector 120, and a second separator 132 are sequentially stacked, is repeated. In addition, the negative electrode current collector 110 and the positive electrode current collector 120 have a structure in which through-type holes are formed in the thickness direction. A plurality of through-type holes are formed in the negative electrode current collector 110 and the positive electrode current collector 120, and these through-type holes promote smooth flow of lithium ions.

Example 2

A secondary battery was manufactured in the same manner as in Example 1, except that a current collector having a mesh structure was used for each of the aluminum and copper current collectors.

Comparative Example 1

A positive electrode and a negative electrode were prepared in the same manner as in Example 1 except that through-thickness holes were not formed in the positive electrode and negative electrode current collectors respectively, and the thickness gradient of the positive electrode and negative electrode mixture layer was not formed.

On the other hand, polypropylene was uniaxially stretched using a dry method to prepare a separator having a microporous structure having a melting point of 165° C. and a width of 200 mm on one side. The first separator was interposed between the positive electrode and the negative electrode, and unit cells having a structure in which the second separator was located outside the positive electrode and the negative electrode were repeatedly assembled to prepare an electrode assembly. The electrode assembly has a structure in which 50 unit cells are sequentially assembled.

After the electrode assembly was built into a hollow rectangular battery case, a 1M $LiPF_6$ carbonate-based solution electrolyte was injected to complete a battery.

Experimental Example 1

Evaluation of Properties of Secondary Battery

Physical properties were evaluated for each secondary battery prepared in Example 1 and Comparative Example 1. Specifically, charging and discharging were performed for each secondary battery, and voltage and temperature changes during charging and discharging were measured, respectively. Charging and discharging of the secondary battery was performed at 20° C. and 1 C.

The result of evaluating the voltage change during charging and discharging of the secondary battery is shown in FIG. 4, and the result of evaluating the temperature change during charging and discharging of the secondary battery is shown in FIG. 5.

First, referring to FIG. 4, it can be seen that the secondary battery according to Example 1 has a high discharge voltage and a low charging voltage compared to Comparative Example 1. Through this, it can be seen that the secondary battery according to Example 1 provides higher power when applied to a product, and requires lower charging power when charging.

Referring to FIG. 5, it can be seen that the secondary battery according to Example 1 has a lower temperature during charging and discharging and a remarkably small variation, compared to Comparative Example 1. Accordingly, the secondary battery according to the first embodiment has a lower required cooling performance, and a more compact design is possible.

Therefore, the secondary battery can be applied to various mobile devices, wearable devices, etc., and it is particularly suitable for small devices such as wireless earphones and smart watches, especially devices requiring long-term use while being limited by the weight and volume of a secondary battery.

In addition, since the secondary battery has excellent output, it can be used for power tools that are driven by a battery-based motor and it is suitable for application to electricity storage systems as well as drones, electric vehicles including electric vehicles (EVs), hybrid electric vehicles (HEVs), plug-in hybrid electric vehicles (PHEVs), etc., electric two-wheeled vehicles including electric bicycles (E-bikes) and electric scooters (E-scooters), and transportation means using high-power electricity, such as an electric golf carts.

DESCRIPTION OF REFERENCE NUMERALS

100: secondary battery
110: negative electrode current collector
111: negative electrode mixture layer
120: positive electrode current collector
121: positive electrode mixture layer
131: first separator
132: second separator

The invention claimed is:

1. A secondary battery having a structure in which n unit cells are radially assembled around a central axis based on a horizontal cross-sectional structure,
wherein n is an integer of 5 or more,
wherein each unit cell has a structure in which a thickness decreases in a direction toward the central axis from an outer end that forms an outer peripheral surface of the secondary battery based on the horizontal cross-sectional structure,
wherein the secondary battery has a cylindrical structure in which n unit cells are radially assembled around the central axis to form a hollow center based on the horizontal cross-sectional structure,
wherein a diameter ratio of inner and outer diameters of the secondary battery is in a range of 1:1.1 to 100, and
wherein each of the unit cells consists essentially of:
a negative electrode current collector;

a single negative electrode mixture layer directly disposed on the negative electrode current collector;

a first separator directly disposed on the negative electrode mixture layer;

a single positive electrode mixture layer directly disposed on the first separator; and a positive electrode current collector directly disposed on the positive electrode mixture layer; and wherein the secondary battery includes a second separator disposed between the positive electrode current collector and the negative electrode current collector such that the second separator is in direct contact with the positive and negative current collectors and directly covers one of an entire surface of the positive electrode and one of an entire surface of the negative electrode, the first and second separators are a porous substrate including at least one selected from a polyolefin porous membrane and a nonwoven fabric.

2. The secondary battery of claim 1, wherein a kth unit cell and a $(k+1)^{th}$ unit cell are adjacent to each other and face each other, wherein the k is an integer between 1 and n−1, wherein a first unit cell and an $n^{th}$ unit cell are also adjacent to each other and face each other, and wherein the n is an integer between 5 and 10000.

3. The secondary battery of claim 1, wherein, in each unit cell forming a battery, a ratio ($D_{in}$:$D_{out}$) of a thickness ($D_{in}$) of an inner end forming an inner peripheral surface of the battery in a center direction and a thickness ($D_{out}$) of the outer end forming an outer peripheral surface of the battery is in a range of 1:1.1 to 100, based on the horizontal cross-sectional structure.

4. The secondary battery of claim 1, wherein, in each unit cell forming the battery, at least one of a positive electrode and a negative electrode has a structure in which a distance between electrodes decreases in a center direction from the outer end that forms an outer peripheral surface of the battery based on the horizontal cross-sectional structure.

5. The secondary battery of claim 1, wherein each unit cell comprises a positive electrode and a negative electrode, and each of the positive electrode and the negative electrode has a structure in which a mixture layer including an active material is applied on a metal current collector, and wherein at least one of the positive electrode or the negative electrode has a structure in which a thickness of the mixture layer applied on the metal current collector decreases in a direction toward the central axis from the outer end that forms the outer peripheral surface of the battery, based on the horizontal section structure.

6. The secondary battery of claim 5, wherein, in each unit cell, at least one of the positive electrode or the negative electrode has a structure in which a density of the mixture layer increases in a direction toward the central axis from the outer end that forms the outer peripheral surface of the battery, based on the horizontal section structure.

7. The secondary battery of claim 1, wherein each of the positive electrode and the negative electrode includes: a current collector; and a mixture layer including an active material disposed on the current collector on a surface facing the first separator.

8. The secondary battery of claim 1, wherein, in each unit cell, at least one of a positive electrode or a negative electrode includes a metal current collector having a porous structure in which through holes are formed in a thickness direction.

9. The secondary battery of claim 8, wherein, in each unit cell, an area ratio of the through holes on a surface of the metal current collector is in a range of 10% to 80%.

10. The secondary battery of claim 8, wherein the metal current collector is in a form of a mesh.

11. The secondary battery of claim 1, wherein a diameter ratio of inner and outer diameters of the secondary battery is in a range of 1:1.5 to 80.

12. The secondary battery of claim 1, wherein a diameter ratio of inner and outer diameters of the secondary battery is in a range of 1:2 to 50.

13. The secondary battery of claim 1, wherein a diameter ratio of inner and outer diameters of the secondary battery is in a range of 1:10 to 100.

14. The secondary battery of claim 1, wherein a diameter ratio of inner and outer diameters of the secondary battery is in a range of 1:30 to 100.

15. The secondary battery of claim 8, wherein, in each unit cell, an area ratio of the through holes on a surface of the metal current collector is in a range of 10% to 70%.

16. The secondary battery of claim 8, wherein, in each unit cell, an area ratio of the through holes on a surface of the metal current collector is in a range of 10% to 50%.

17. The secondary battery of claim 8, wherein, in each unit cell, an area ratio of the through holes on a surface of the metal current collector is in a range of 30% to 60%.

18. The secondary battery of claim 8, wherein the polyolefin-based porous membrane includes at least one selected from the group consisting high density polyethylene, linear low density polyethylene, low density polyethylene, ultra high molecular weight polyethylene, polypropylene, polybutylene, polypentene, and a mixture thereof.

* * * * *